(12) United States Patent
Gillott

(10) Patent No.: US 6,499,582 B1
(45) Date of Patent: Dec. 31, 2002

(54) CHUTE

(75) Inventor: Neil T. Gillott, Frederick, MD (US)

(73) Assignee: Crisplant Inc., Frederick, MD (US)

( * ) Notice: Subject to any disclaimer, the term of this patent is extended or adjusted under 35 U.S.C. 154(b) by 0 days.

(21) Appl. No.: 09/543,586

(22) Filed: Apr. 5, 2000

Related U.S. Application Data

(60) Provisional application No. 60/128,183, filed on Apr. 5, 1999.

(51) Int. Cl.⁷ .............................................. B65G 37/00
(52) U.S. Cl. .................. 198/360; 198/370.4; 198/31 R; 198/370.03; 198/435
(58) Field of Search ........................... 198/370.04, 360, 198/370.03, 435; 193/31 R, 31 A

(56) References Cited

U.S. PATENT DOCUMENTS

| | | | | |
|---|---|---|---|---|
| 1,302,466 A | * | 4/1919 | Wilson et al. ........ | 193/31 A X |
| 4,984,676 A | * | 1/1991 | Michel ................... | 198/370 X |
| 5,277,292 A | * | 1/1994 | Boxall .................. | 193/31 A X |
| 6,050,390 A | * | 4/2000 | Fortenbery et al. .... | 198/370.03 |
| 6,095,314 A | * | 8/2000 | Fortenbery ......... | 198/370.04 X |
| 6,168,006 B1 | * | 1/2001 | Bytow ................... | 198/370.04 |
| 6,227,377 B1 | * | 5/2001 | Bonnet ................... | 198/435 X |

* cited by examiner

Primary Examiner—Joseph E. Valenza
Assistant Examiner—Richard Ridley
(74) Attorney, Agent, or Firm—Birch, Stewart, Kolasch & Birch, LLP

(57) ABSTRACT

A discharge chute having at least one discharge station for receiving items from a single feed source. The chutes can have a receiving trough or upper flipper door for initially receiving the items. The items are then fed to a pivotable flipper door which discharges the items to a selected delivery lane. At least one delivery lane is accessible by the flipper door. Each delivery lane will have a discharge station from which the operator can remove and package the selected items.

17 Claims, 5 Drawing Sheets

CHUTE

This application claims the benefit of 60/128,183, filed Apr. 5, 1999.

BACKGROUND OF THE INVENTION

1. Field of the Invention

The present invention relates to a chute for feeding one or more articles to a plurality of delivery lanes. This chute can receive items from a sorter or other input device. Forward travel momentum of items fed to the chute can be slowed in two ways. Either a trough with an upwardly curved wall or an upwardly inclined flipper door can be used as will be described. Downstream from the trough or upper flipper door portion, a lower flipper door can be provided for delivering the articles to one of a plurality of delivery lanes. These delivery lanes are vertically arranged one above the other with the final discharge station being located at the end of each lane.

2. Description of the Background Art

Various chutes are known for receiving articles. For example, a spiral chute can be used for receiving an article from a sorter. Such chutes, however, have limited capacity in that only one discharge location is provided per chute and handling of some objects is not appropriate for all applications.

SUMMARY OF THE INVENTION

Accordingly, it is a primary object of the present invention to provide a chute which will handle objects without damaging them. In addition, it is a further object of the present invention to provide a chute with increased capacity.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only,. and thus are not limitative of the present invention, and wherein.

DETAILED DESCRIPTION OF THE PREFERRED EMBODIMENTS

Figure 1:
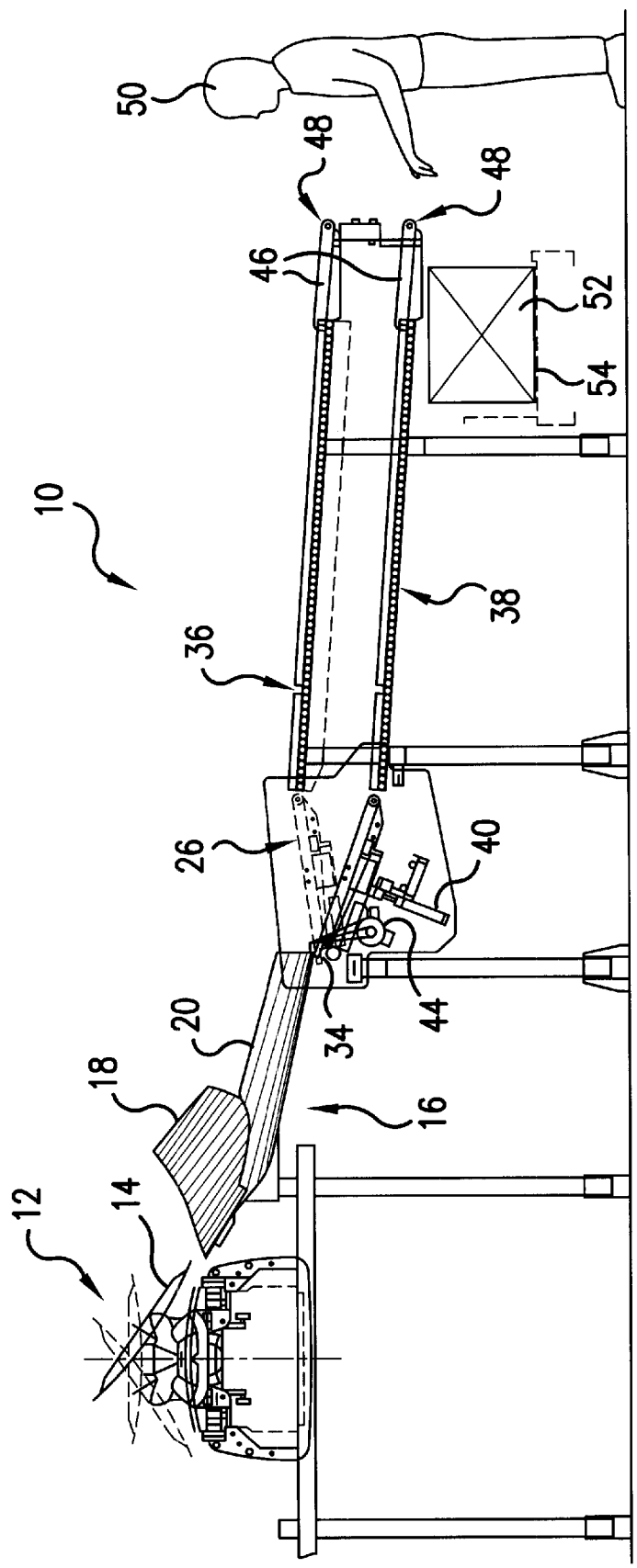
FIG. 1 shows a side view of a first embodiment of the chute of the present invention.

Referring in detail to the drawings and with particular reference to FIG. 1, a first embodiment of a chute 10 is shown. A conventional sorter 12 is used to feed items to chute 10. This sorter 12 can be a tilt tray sorter, conveyor or any other type of material handling system. The tray 14 of sorter 12 is shown in its tilted discharge position. As is conventional, many selectively tiltable trays 14 can be provided on sorter 12. The trays 14 move past the various chutes 10 and are tiltable from the dotted line horizontal position to either a right or left-hand discharge position depending on the location of chute 10. While a tilt. tray sorter 12 has been indicated for feeding articles to the chute 10, it is contemplated that any suitable input device could be used as noted above. For example, a conventional cross-belt sorter, conveyor with a pusher arrangement, delivery carts, or manual feeding to the chute 10 is possible. Many different input arrangements for items are possible.

With the present invention, it is contemplated that many different types of items could be handled. For example, books, compact discs, cassette tapes, DVD's, magazines, toys, boxes and in fact, many different types of articles can be handled. Moreover, as will be described hereinbelow, the contour of the chute can be varied in order to accommodate different sized or different shaped articles. For example, if round objects such as balls were to be handled, the trays 14 of the tilt tray sorter 12 could be configured to hold balls as well as other articles. Further modifications to the downstream components of the chute 10 will be described later whereby different sized or shaped articles can be accommodated. Nonetheless, it should be appreciated that many different types of articles can be handled with the chute 10 of the present invention.

In the chute 10, a receiving station or trough 16 is provided. It is contemplated that the trough 16 will be made from metal or any other suitable material. This trough 16 includes a curved upper portion 18 and a downstream slide 20. The curved upper portion 18 includes a flat receiving section 22 and an upwardly curved portion 24. The flat receiving section 22 is basically in the same plane as the tilted tray 14 so that it can receive the articles from the tray without unnecessary jarring of the article. If so desired, an additional slide can be provided between the tilt tray sorter 12 and this flat receiving section 22 to thereby accommodate any gaps.

Articles will be dumped from the moving tilt tray sorter 12 onto the flat receiving section 22 of the trough 16. The tilt tray sorter 12 will be moving into the page as seen in FIG. 1. Therefore, the discharged articles will have a forward momentum. Due to this forward momentum, the discharged articles will move from the flat receiving section 22 up the curved portion 24. This upward sliding motion slows or decreases the momentum of the article. Gravity will cause the article to then move from the upwardly curved portion 24 down the slide 16 to a flipper door 26. The articles will therefore slide from the flat receiving section 22 through the upwardly curved portion 24 and can then slide back against an opposed wall 28 of the slide 20. It should be noted in FIG. 2 that the walls 28 and 30 of the slide 20 are inclined in order to guide the articles to a central portion of slide 20. The size of the trough can be changed to accommodate a wider or different product mix.

Figure 3:
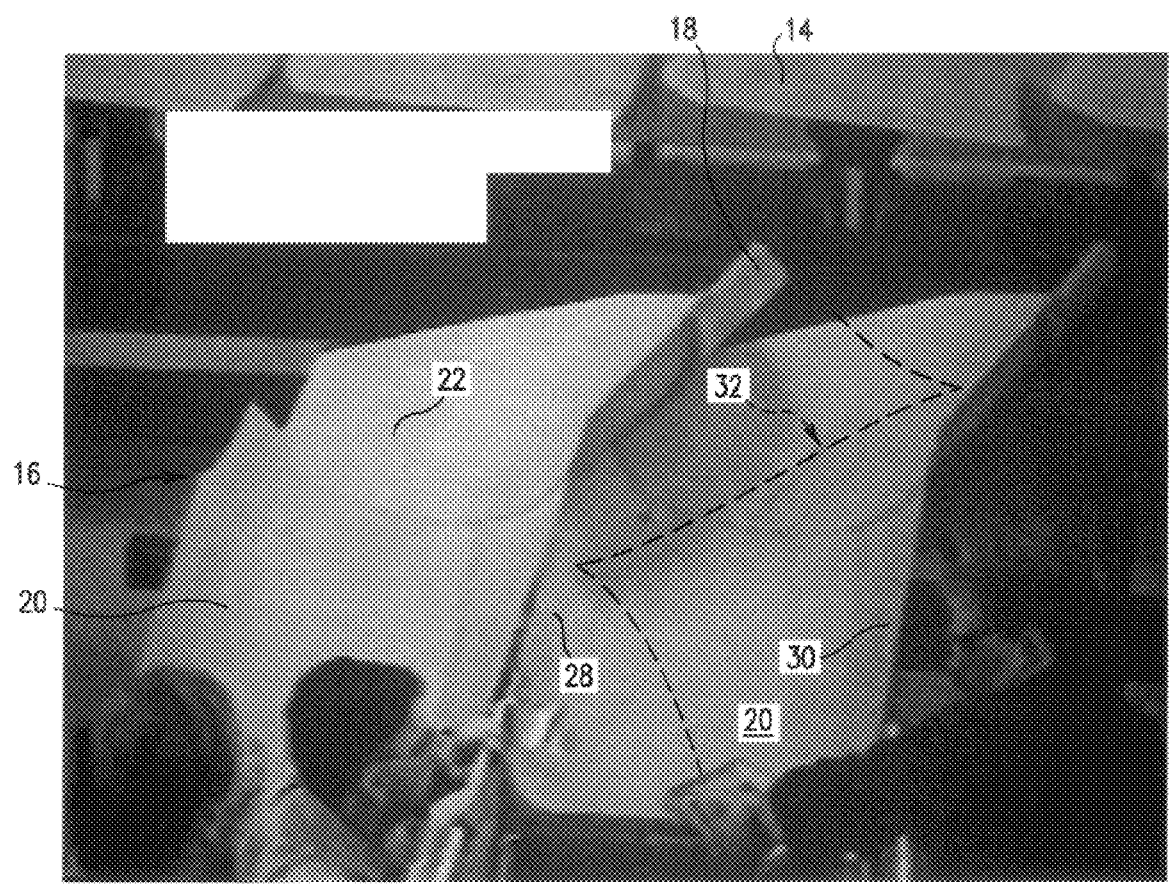
FIG. 3 shows an end view of a portion of the chutes of the first embodiment of the present invention.

Turning to FIG. 3, the path 32 of movement of a discharged article is shown in dotted lines. The exact path for a particular item is determined by many factors. For example, the weight, configuration and texture/slickness of an item can affect the exact path along it which would travel. For example, some items may travel up the curved portion 24 but not rebound against the lower opposed wall 28. Moreover, some items might actually hit both the wall 28 and the other wall 30 of slide 20. Nonetheless, there is a bob sled-like motion which generally serves to slow the forward momentum of the items dumped from tray 14 of the tilt tray sorter 12.

Figure 2:
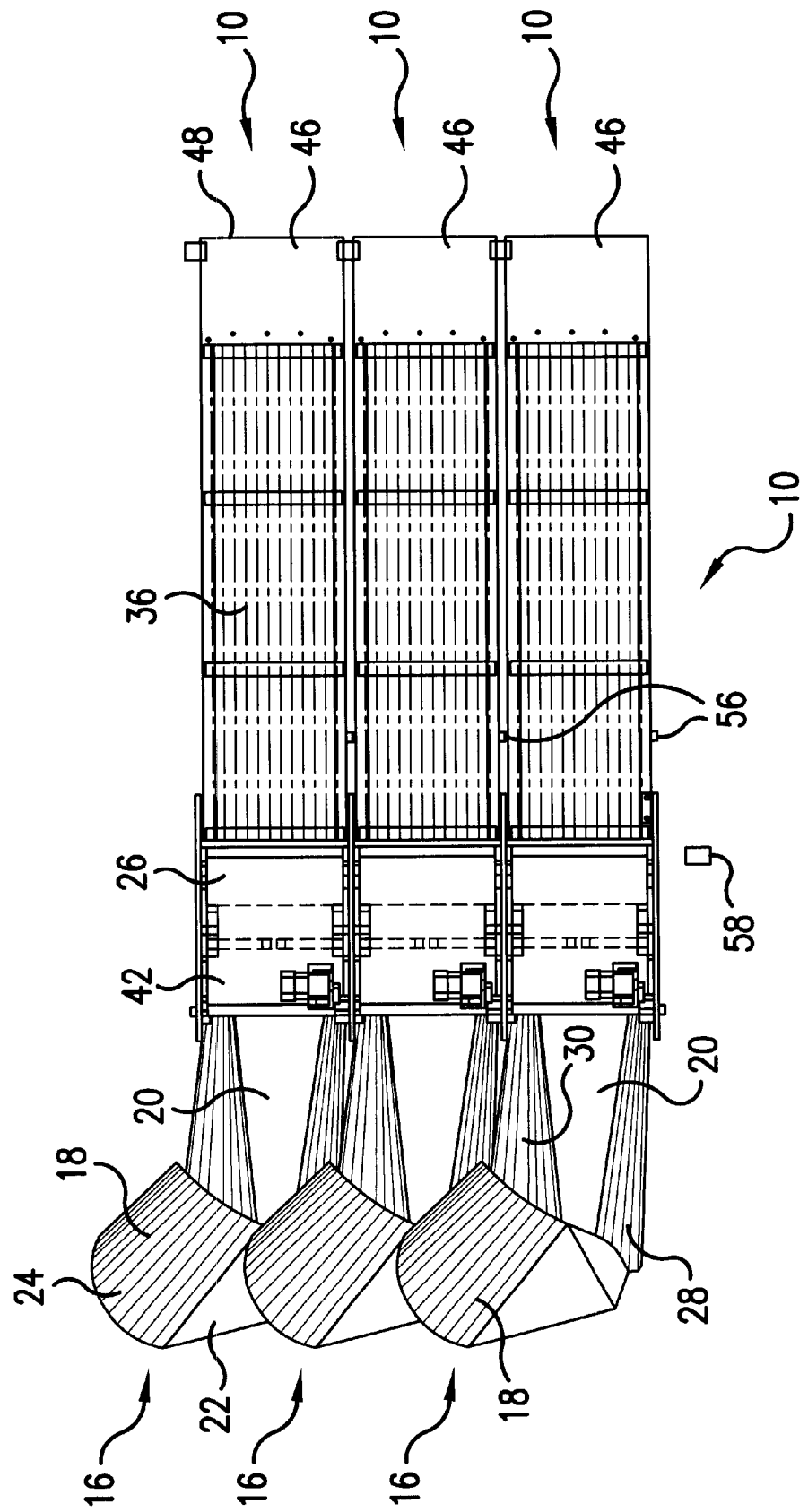
FIG. 2 shows a plan view of the chute of FIG. 1.

From the receiving station or trough 16, items move to the flipper door 26 as seen in FIGS. 1 and 2. This flipper door 26 is pivotable about point 34. The door 26 can deliver items to either upper delivery lane 36 or lower delivery lane 38. A pneumatic cylinder 40 is provided for pivoting the flipper door 36. Of course, any other suitable means for moving this door can be provided. For example, a linear actuated device, hydraulic cylinder, rack and pinion drive or other arrangement could be used for moving the door 26 between its solid line position in FIG. 1 to its dotted line position. In the solid line position of FIG. 1, the flipper door 26 will delivery items to the lower delivery lane 38. In the raised position, the door 26 will delivery items to the upper delivery lane 36. While two lanes are shown in FIG. 1, it should be contemplated that one or more delivery lanes could be used, if so desired. For example, three lanes overlying one another could be used. Also, the door 26 could be pivotable about a vertical axis or longitudinally slidable to thereby deliver articles to side-by-side lanes.

In FIG. 1, it will be noted that when the flipper door 26 is in its raised position as shown in dotted lines, there is a slight upward path to the upper delivery lane 36. It is possible to design the positioning of the upper delivery lane to be horizontal with or lower than the pivot point 34. However, on the flipper door 36, a powered conveyor 42 is provided. A drive 44 is provided for moving this conveyor 42. This conveyor 42 allows articles to be lifted from the door 26 to the upper delivery lane 36.

While a belt conveyor 42 which extends across the width of door 26 is shown, any suitable conveyor arrangement could be used. For example, a series of powered belts could be used; a single powered belt with other nonpowered belts, power rollers or other types of conveyors could be used. Alternatively, a pusher arm could be provided in order to slide the item along the flipper door 26.

An advantage of using the power conveyor, is that it not only raises items to a position above pivot point 34 (such as upper delivery lane 36 as shown in FIG. 1), this conveyor 42 also controls the speed at which items enter the delivery lanes 36, 38. In particular, if items enter the lanes 36, 38 at a fast speed, then previously fed items residing in a lane might be damaged by these incoming items. Moreover, items of different sizes or weights might enter the lanes 36, 38 at inconsistent speeds. The powered conveyor 42 helps make the delivery of items to the lanes 36, 38 at a uniform speed. Thus, regardless of the speed at which the items come down slide 20, the flipper door 26 can ensure that they will enter the lanes 36, 38 at an appropriate speed. Therefore, feeding of heavy items will not damage items already residing in the lanes 36, 38.

Both of the delivery lanes 36, 38 contain a series of rollers. A single roller can extend across the entire width of the lanes or a series of rollers can be provided across the width of the lane. It is contemplated that these rollers in the lanes 36, 38 will not be powered but they could be powered rollers if so desired. Moreover, a simple slide arrangement or powered belt arrangement could be used if so desired.

At the end of each of the lanes 36, 38, a discharge station 46 is provided. This discharge station 46 does not contain rollers. Therefore, items will tend to stop before reaching the end 48 of the lanes 36 or 38. It is contemplated that a raised wall will be provided at the end 48 of the lanes 36, 38 in order to prevent items from falling from the discharge station 46. This wall is not shown in FIG. 1. Because rollers are not provided at the end 48 of the lanes, the first fed items should stop short of this raised wall. Therefore, if a second fed item travels down the lane 36 or 38, it may engage the first fed item and slightly push it forward. Eventually, the feeding of items causes the first delivered item to engage the wall at the end 48 of the lanes. Due to this initial spacing of the item from the wall, the impact of later fed items can be absorbed without damage to the initially fed item. In other words, if the item were initially fed against the wall at the end 48 of the lane 36 or 38, then the next fed item would simply slam against the first fed item and possibly damage this item. Because the first fed item can slide slightly to absorb the impact of a second fed item, possible damage to the fed items can be avoided.

The end 48 of the discharge stations 46 can also have a material which will help to grip and slow the fed items. For example, rubber or other materials used to make a conveyor belt can simply be used in this section in order to slow the initial momentum of the item. This material can generally help to prevent the first fed item from reaching the wall at the end 48 of a particular chute. A tacky material could also be used in order to catch the items. Of course, if an item has enough momentum or weight, this first fed item might nonetheless reach the wall at the end 48. Nonetheless, this pre-stopping of fed items generally serves to protect the items. In addition, a roller discharge station could be used if the product requires it.

The chute 10 is contemplated as receiving a plurality of items in either or both delivery lanes 36, 38. For example, a particular order may require different items stored in a warehouse. The tilt tray sorter 12 and chute 10 located at the warehouse will accumulate the items in order to be packaged and shipped. An operator 50 can remove the loose items from either lane 36 or 38 which form an order. These items are placed into carton 52 by the operator 50. Of course, this packaging step could be automated.

While not shown, it is contemplated that some sort of table is provided on which the empty carton 52 will sit. The entire order may be resting on one of the lanes 36 or 38 before the operator 50 begins to fill carton 52 or the operator can partially fill the carton 52 as items accumulate in the lanes 36 or 38.

Nonetheless, when a carton 52 is filled, it can then be placed on a discharge conveyor 54. This discharge conveyor 54 is schematically shown in FIG. 1 by dotted lines. It is contemplated that this discharge conveyor can be placed in an out-of-the-way position such as beneath the lanes 36, 38. When the filled carton 52 is placed on conveyor 54, it will then automatically move to a downstream accumulation or shipping station.

As seen in FIG. 2, a plurality of chutes 10 are provided adjacent one another. An operator 50 can work at several different adjacent chutes 10. The conveyor 54 for discharging filled cartons 52 will extend beneath all of these chutes 10. Each of the chutes is complimentary arranged to have a receiving trough 16, flipper door 26 and delivery lanes 36, 38. While only three chutes 10 are shown in FIG. 2, any number of chutes can be used. For example, in FIG. 3, two side-by-side chutes are shown. A section of the upper portion 18 of the receiving trough 16 overhangs an adjacent chute as shown in FIG. 3. Of course, these chutes 10 can be spaced such that there is no such overhang. Nonetheless, the present invention provides a plurality of chutes 10 which can be closely packed in order to maximize efficiency of the system.

A photoeye or photodetector 56 can be provided for each lane 36 and 38 to detect when the lanes have become filled. A signal will be sent from the photoeye 56 to the controller of the tilt tray sorter 12 or other filling device. This signal will indicate that the filled lanes should receive no additional items until the operator 50 removes some items and the photoeye 56 gives a "clear" signal. The operator can be notified of a filled or empty situation by a light or other means. Each of the lanes 36, 38 can have such a photoeye 56 or a single photoeye can be provided for a plurality of lanes. For example, one photoeye 56 can extend across the three upper lanes 36 and a second photoeye can extend across the three lower lanes 38 of FIG. 2. If any of the lanes become filled, then all three would be "shut down".

Apart from the photoeye 56, a second photoeye 58 can be provided in the area of the flipper door 56. If an item becomes jammed or if one of the flipper doors is not properly working, this malfunction can be detected by the photoeye 58. It is contemplated that a single photoeye 58 will extend across a series of flipper doors 56. Therefore, if a problem arises, the entire series of chutes 10 will be temporarily shut down. Problems can arise for example if the drive 44 for the powered conveyor 42 breaks down. This would cause items to stop on the flipper door 56. This malfunction situation can be detected by the photoeye 58 and the section of chutes 10 controlled by this photoeye 58 can be temporarily shut down until the problem is fixed. In that way, potential damage to handled articles can be avoided.

As was previously noted, the trays 14 on the tilt tray sorter 12 can be modified in order to accommodate particular shapes or sizes of items. For example, if balls or other round items are handled, then depressions or other recesses can be provided on the trays 14 to hold the balls in position. Of course, these trays 14 can also be arranged to simultaneously handle flat items or other shapes of items as needed. The raised walls 28 and 30 of slide 20 help to guide such items. The conveyor 42 and flipper door 26 can also be in a concave arrangement to handle balls or can have other shapes to accommodate articles. Finally, the delivery lanes 36 and 38 can also be configured to compliment the shape or size of the handled items. While such modifications may be made in order to handle different shaped or sized items, it is contemplated that these systems will not be limited to solely handling uniquely shaped items. Such a modification to a chute 10 would not limit its ability to handle items other than the round or other uniquely shaped or sized items. Therefore, there is great flexibility with the chutes 10 of the present invention.

Figure 4:
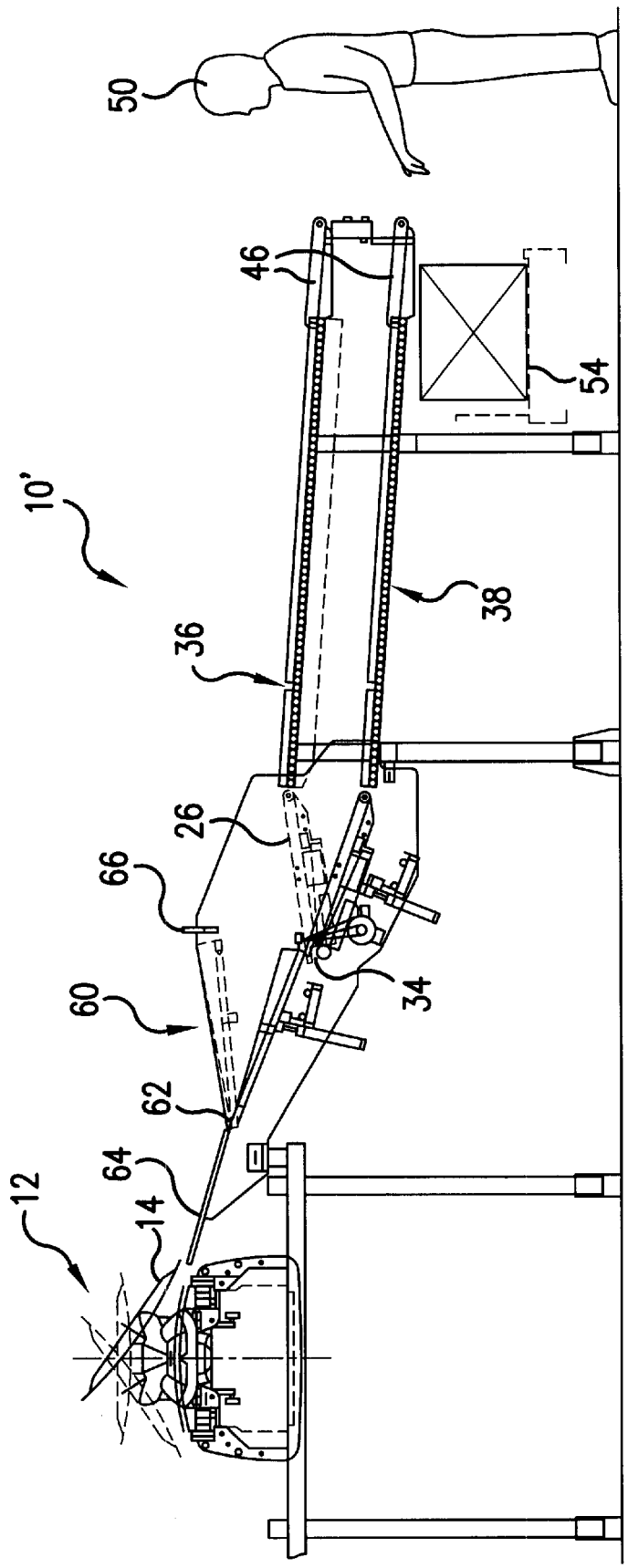
FIG. 4 shows a side view of a chute of a second embodiment of the present invention.
Figure 5:
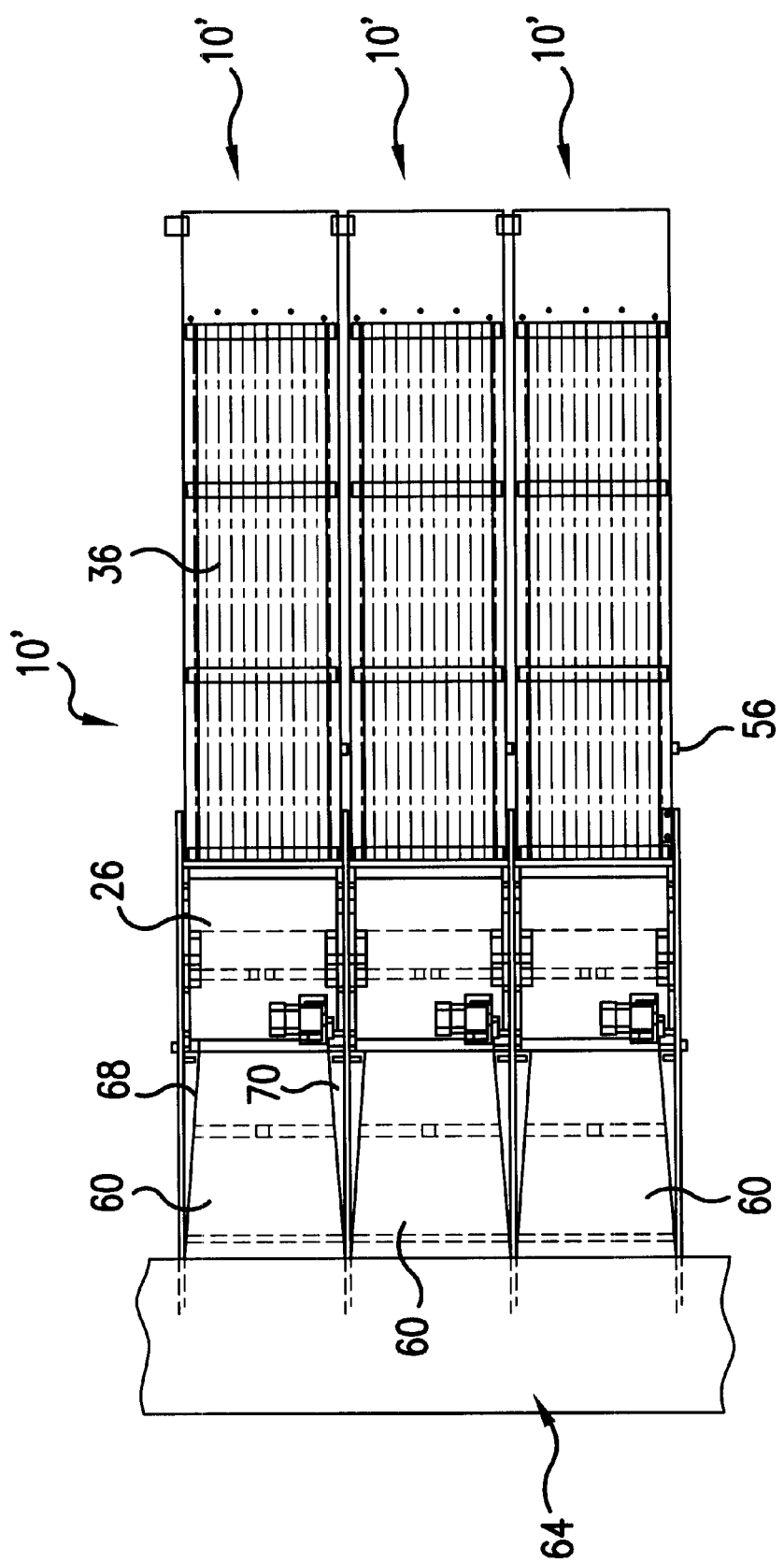
FIG. 5 shows a plan view of the second embodiment of FIG. 4.

Turning to FIGS. 4 and 5, a second embodiment 10' of the chute is shown. The described components and potential modifications to the chute 10 of the first embodiment are equally applicable to this second embodiment. Similarly to the first embodiment, this chute 10' has a tilt tray sorter 12 with a plurality of pivoting trays 14. In the second embodiment, a flipper door 26 and upper delivery lane 36 and lower delivery lane 38 are also provided. Each delivery lane has a discharge station 46 accessible by operator 50. In the embodiment of FIG. 4, however, the second embodiment of the chute 10' has the receiving station or trough 16 replaced with an upper flipper door 60. This door 60 is pivotable about point 62 between its raised position shown in dotted lines and its inclined position. The door 60 can be made from sheet metal or any suitable material.

In the raised position shown in dotted line in FIG. 4, the discharged items delivered to the upper flipped door 60 will travel upwardly. Instead of using the different curved sections of trough 16 in order to slow the forward momentum of items in a bob sled-like manner, the second embodiment of the chute 10' uses the forces of gravity. In particular, the items discharged from tray 14 will travel down slide 64 to the raised, upper flipper door 60. This slide 64 can be made from wood or any other suitable material. Articles moving on raised door 60 will travel uphill, thereby slowing their momentum. A braking wall 66 is provided. If items have sufficient momentum such that the upward travel does not stop their movement, this wall 66 will ensure that they stop and do not come off the end of flipper door 60. It is contemplated, however, that the uphill movement of the items will normally be sufficient in order to stop their movement.

After a predetermined period of time, for example, four seconds, the upper flipper door 60 can pivot from its raised dotted line position in FIG. 4 to its lower solid line position. In this position, the articles will simply slide to the downstream flipper door 26. Like the first embodiment, this flipper door 26 is pivotable about point 34 to thereby discharge items to the upper delivery lane 36 or lower delivery lane 38. It is contemplated that the powered conveyor 42 will be utilized on door 26 in order to provide a uniform delivery speed to the lanes 36, 38.

While the upper flipper door 60 is contemplated as simply being a metal slide, it is possible that a powered conveyor or other suitable arrangement can be used in order to transfer the items from the upper flipper door 60 to the flipper door 26. The braking wall 66 is positioned such that items can freely move beneath it when the upper flipper door 60 is pivoted to its lower position.

As seen in FIG. 5, a plurality of chutes 10' are provided adjacent one another similarly to the first embodiment. Each of these chutes 10' has the upper flipper door 60, a second flipper door 26 and upper delivery lane 36 and lower delivery lane 38. The sides 68, 70 of the upper flipper doors 60 are raised in order to aid in centering or alignment of received items. While a continuous slide 64 is shown for at least three of the chutes 10', each chute 10' could have its individual slide 64. Moreover, the slides 64 could be omitted such that the trays 14 deliver items directly to the pivotable flipper doors 60.

It is contemplated that when items are delivered from sorter 12 to either the trough 16 of the first embodiment of chute 10 or to the slide 64 and/or upper flipper door 60 of the second embodiment 10', the items will generally maintain their same orientation. In particular, items fed from sorter 12 with their longitudinal axis extending generally in the direction of the chute 10 will normally end up with their longitudinal axis pointing in the same direction when they reach the discharge station 46.

While not shown, the photoeye 58 for the flipper door 26 can also be used in the embodiment of FIG. 5. Similarly, the upper flipper doors 60 can also have a photoeye in order to detect proper operation, if so desired.

In operation, items can be fed from the tilt tray sorter 12 or any other suitable device to either chute 10 or 10'. In the chute 10, items will travel through the receiving station or trough 16 to the pivotable flipper door 26. The powered conveyor 42 will control the speed of delivery for these items to either the upper delivery lane 36 or lower delivery lane 38. Pivoting of the flipper door 26 about point 34 will position the door for discharge to the appropriate lane. It is contemplated that the flipper door 26 will be moved to its appropriate position before the item is deposited thereon. Once the item reaches lane 36 or 38, it will then move to the discharge station 46. The operator 50 will then remove the items from the discharge station 46, package them in carton 52 and discharge the carton along conveyor 54. In the second embodiment using the chute 10', instead of having the receiving station or trough 16, an upper flipper door 60 is provided for stopping momentum of received items. The upper flipper door 60 will remain in its raised position until the item settles and then discharge the item to the downstream flipper door 26.

Because each chute 10 and 10' contains two or more discharge stations 46 and because the chutes can be placed very close together, the efficiency of the packaging system of the present invention can be greatly enhanced. Current design is modified and optimized for a particular package type and size. This design can be designed to optimize and handle a different product range.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A chute comprising:
   a plurality of discharge stations;
   a delivery lane for each of the discharge stations, the delivery lanes feeding items to an associated discharge station;
   a pivotable flipper door for feeding items to a selected deliver lane;
   an input for receiving items for the chute; and
   a device for slowing speed of items moving from an input device to the pivotable flipper door, the device for slowing speed changing direction of movement of the items in order to slow the items and being located between the input and the flipper door, the items moving over the device for slowing during their movement from the input device to the pivotable door,
   wherein the delivery lanes are located in a vertical column and form a first delivery lane group and wherein the chute comprises a second plurality of discharge stations with each having second delivery lanes, the first and second groups of delivery lanes being side-by-side.

2. The chute according to claim 1, wherein the device for slowing comprises a receiving station between the input device and the flipper door, the receiving station having upwardly curved sides and an input end and a discharge end, the input end of the device for slowing being adjacent the input of the chute and the discharge end of the device for slowing leading to the flipper door, items moving from the input end to the discharge end traveling along a zigzag path between the sides of the device for slowing.

3. The chute according to claim 1, wherein items are movable in a zigzag path along the device for slowing as the items move from an input end to a discharge end of the device for slowing, the input end being adjacent the input of the chute and the discharge end leading to the flipper door, the zigzag path being changing the direction of movement for the items.

4. The chute according to claim 1, wherein flipper door is a first flipper door and wherein the device for slowing comprises a second flipper door, the second flipper door being between the input and the first flipper door, the second flipper door lifting items received therein to change the direction of movement of the items thereby slowing the speed of the items.

5. The chute according to claim 1, wherein the input device comprises a tilt tray conveyor which runs past the input of the chute.

6. The chute according to claim 1, further comprising a powered conveyor provided on the flipper door.

7. The chute according to claim 1, wherein each of the discharge stations have a raised wall at a downstream end thereof to prevent items from falling from the lanes and further comprising stop means which tend to stop items before reaching the raised walls of the discharge stations to initially keep items out of contact with the raised walls.

8. The chute according to claim 7, wherein the discharge lanes have conveying devices except at the stop means whereby items will readily move between input ends of the discharge lanes to the stop means and at the stop means, the items will tend to stop moving before reaching the raised walls.

9. The chute according to claim 8, wherein the stop means includes a material which will grip and slow feed of the items.

10. A method for feeding items from a supply, the method comprising the steps of:
    inputting items to a chute;
    selecting a delivery lane in the chute to which the items are to be delivered;
    diverting the items to follow a path to the selected delivery lane, the diverting being accomplished by a pivotable flipper door; and
    slowing speed of the items from input to the selected delivery lane, the step of slowing including changing a direction in which the items move while simultaneously reducing momentum of the items to thereby slow the items, the step of slowing occurring before the step of diverting,
    wherein the delivery lanes have a stop at an end thereof and wherein the method comprising the step of stopping the items prior to reaching the stop of the delivery lanes.

11. The method according to claim 10, further comprising the steps of:
    conveying the items to the chute by an input device; and
    receiving the items at a receiving station during the step of inputting, the items moving from the input device to the receiving station and thereafter following a zigzag path to the pivotable flipper door, the zigzag movement causing the step of slowing the speed of the items.

12. The method according to claim 11, wherein the items are conveyed in a first direction adjacent the chute during the step of conveying and wherein the items travel in generally a second direction when moving to the delivery lane with the first direction being perpendicular to the second direction.

13. The method according to claim 11, wherein the receiving station has upwardly curved sides and wherein the items travel from side to side of the receiving station during the zigzag movement.

14. The method according to claim 10, wherein the step of slowing speed of the items comprises the step of lifting the items after input to the chute but before delivery to the delivery lane such that the direction in which the item moves is changed and the momentum is reduced.

15. The method according to claim 14, wherein the flipper door is a first flipper door and wherein a second flipper door is provided, the step of lifting being done by the second flipper door and the step of diverting being done by the first flipper door.

16. The method according to claim 10, wherein the step of inputting items uses a tilt tray conveyor and wherein a plurality of delivery lanes are located in a vertical column and form a first delivery lane group and wherein a second group of delivery lanes are provided next to the first delivery lane group with the groups of delivery lanes being side-by-side.

17. A control system for feeding items from a supply, the control system comprising:

a chute for receiving the items;

control means for determining a location in the chute which will receive an item, the location in the chute being one of at least two delivery lanes, each of the delivery lanes having a discharge station;

a pivotable flipper door for controlling a path of the items to deliver an item to a selected delivery lane;

a device for slowing speed of items moving to the pivotable flipper door, the device changing direction of movement of the items in order to slow the items and being located before the flipper door, the items moving over the device for slowing during their movement to the pivotable door; and stopping means for tending to stop the items before they reach an end of the selected delivery lane, wherein the flipper door is a first flipper door and wherein the device for slowing is a second pivotable flipper door before the first flipper door, the second flipper door changing the direction of movement of the items in order to reduce momentum of the items and slow the items, the items moving from the second flipper door to the first flipper door.

* * * * *